June 28, 1927.
R. E. DOHERTY
1,633,808
REGULATING SYSTEM FOR DYNAMO ELECTRIC MACHINES
Filed May 9, 1925
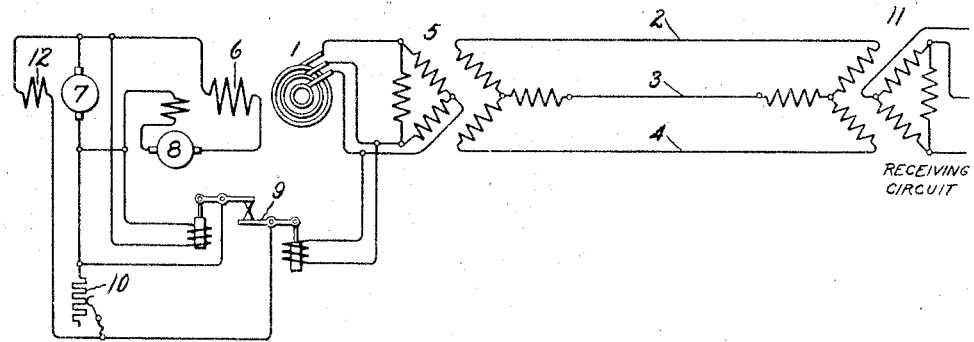
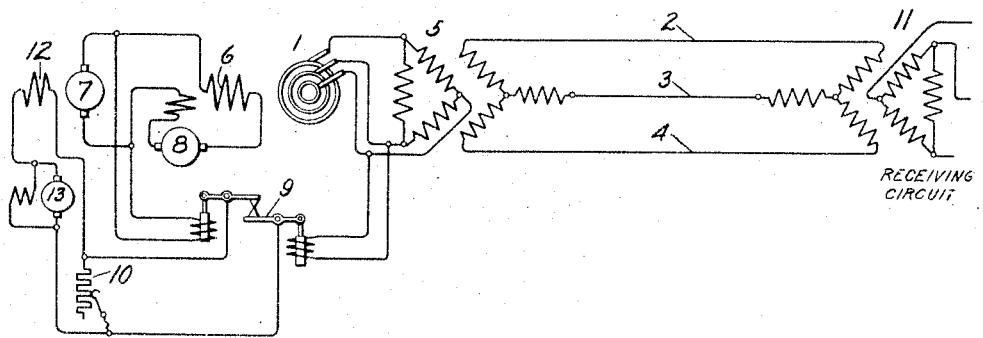
Inventor:
Robert E. Doherty,
by *Alexander S. [illegible]*
His Attorney.

Patented June 28, 1927.

1,633,808

UNITED STATES PATENT OFFICE.

ROBERT E. DOHERTY, OF SCOTIA, NEW YORK, ASSIGNOR TO GENERAL ELECTRIC COMPANY, A NEW YORK CORPORATION.

REGULATING SYSTEM FOR DYNAMO-ELECTRIC MACHINES.

Application filed May 9, 1925. Serial No. 29,246.

My invention relates to electrical power transmission and more particularly to regulating systems for synchronous alternating-current machines on high-voltage long-distance power transmission systems.

In connection with the problem of long-distance power transmission, the voltage stability of the synchronous machines, that is, the inherent regulation, becomes a predominating factor. To illustrate, the ultimate maximum power which can be transmitted over a 500 mile, 220,000 volt, three-phase line of ordinary construction, is about 50% greater when assuming generating apparatus with no tendency for voltage change during load changes than when using synchronous generators of ordinary design and of usual capacity relative to the load transmitted. An alternator controlled by even a sensitive regulator, such for example, as a Tirrill or vibratory-type of regulator, behaves for sudden changes in load much the same as if it were operating at a constant field current. The terminal voltage must first change and cause a change in the setting of the contacts, before a corresponding change in the exciting current takes place. It is this time lag in the operation of the regulator that imposes a serious limitation upon the output of the long-distance power transmission lines because of the inability of the regulator to hold up the voltage upon sudden application of load. It is, therefore, desirable to stiffen the synchronous machine, that is to hold up the terminal voltage during the period between application of sudden load and the final action of the voltage regulator.

An object of my invention is to provide a novel regulating system to momentarily stiffen the synchronous machines of a high-voltage long-distance power transmission line in order to increase the power limit of the line during the transient following a sudden increase in load.

Briefly described, my invention comprises means for rapidly increasing the voltage in the excitation circuit of synchronous alternators or condensers during field current transients, caused by sudden application of a load or short circuit, so as to prevent a too rapid decrease of the excitation at a time when it is desirable to have the excitation maintained on the machine. Preferably, I accomplish these results by providing an auxiliary source of excitation in series with the ordinary shunt-wound exciter in the excitation circuit of the synchronous machine. This auxiliary source of excitation, such as a series-type exciter, is designed for quick action, as by laminating the field poles and operating undersaturated, so as to provide a voltage to maintain the current induced in the excitation circuit on sudden application of load upon the synchronous machine.

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawing, in which Fig. 1 is a diagrammatic representation of a transmission line and generating station with regulating means embodying my invention, and Fig. 2 is a diagram of a modification of the system shown in Fig. 1.

Referring to Fig. 1, 1 denotes a three-phase alternating-current generator providing the energy to be transmitted over step-up transformer 5, the transmission line comprising conductors 2, 3 and 4, and the step-down transformer 11 to a receiving circuit. The field winding 6 of alternator 1 is energized by means of a direct current shunt-wound exciter 7 which may be of ordinary design, and an auxiliary series-wound direct-current exciter 8 with laminated field poles connected in series with the excitation circuit. The energization by the exciter 7 may be controlled by means of an ordinary Tirrill-type voltage regulator 9 or any other similarly sensitive type of regulator in combination with a resistance 10 operating on the field of exciter 7.

Before discussing the operation of the system it is important to note that the ordinary combination of an exciter with a Tirrill-type of regulator will not produce the excitation to counterbalance the armature reaction of an alternator quickly enough for purposes of stability in long-distance power transmission. When load is thrown upon an alternator, the sudden change in armature reaction induces an increase in the field current to balance the armature reaction. However, the voltage of a shunt exciter is not capable of rising instantaneously and the alternator field current begins to die down before the exciter can build up the necessary voltage to maintain it. The difficulty lies in the fact that the flux of the shunt exciter links the turns of the shunt winding. In order to increase the induced voltage of the exciter, it is necessary to build up the flux interlinking these turns. If the exciter is compounded the series and shunt field windings link with the same magnetic circuit. Hence any sudden increase in ampere turns due to the series winding will, by transformer action, induce a corresponding decrease in the shunt field ampere turns, thus maintaining, for the moment, the same magnetic flux.

The operation of the regulating system consists broadly in partially balancing the effect of armature reaction in an alternator by maintaining for a limited time the instantaneous increase in excitation current occasioned by sudden application of load. An unsaturated series exciter responds quickly to a field current change and supplies a voltage proportional to its current. The voltage introduced in the excitation circuit by the series exciter is in a direction to function as an equivalent negative resistance. An unsaturated series exciter 8 or any similarly sensitive source of excitation is interposed in the excitation circuit of alternator 1 so that during any field transient the series exciter will tend to build up and maintain the alternator field current until the regulator 9 functions to increase the voltage of the shunt exciter 7.

The shunt-exciter with the regulator is therefore instrumental in regulating the excitation for steady-state conditions, that is, when a permanent condition is obtained; during the interval between two permanent conditions, that is, when transient phenomena occur, the sensative, quick acting source of excitation supplies a voltage to maintain the field current transient.

Since the duration of the transient is measured by the ratio of inductance to resistance in the circuit, it follows that by introducing a negative resistance equal to the positive resistance, or ohmic resistance, the duration would be indefinitely increased. It is not desirable to go to this limit, but it has been found that if during any field transient the equivalent negative resistance is adjusted to be slightly less than the equivalent positive resistance of the circuit, the series exciter would tend to build up and maintain the alternator field current until the regulator causes the shunt exciter to increase its voltage.

In Fig. 2 is shown a similar arrangement of apparatus as hereinbefore discussed, in which like numerals have been used to refer to corresponding parts. This figure, however, shows the field winding 12 of the shunt exciter 7 separately excited. Any suitable source, for example a battery, may be used; a direct-current shunt-wound generator 13 being indicated. This arrangement is found convenient in order to prevent any tendency toward instability in the shunt exciter 7 when it is found necessary to make the negative resistance more nearly equal to the positive resistance for a particular alternator field. The separately excited field winding will insure a constant source of exciter field voltage independent of voltage change in the alternator excitation circuit. The shunt exciter 7 may be regulated in the ordinary way by an automatic voltage regulator 9.

With the introduction of the series exciter 8 in the excitation circuit, the alternator 1 will now tend to maintain its terminal voltage at the normal value due to the prolonged duration of the field transient and will require less duty by the regulator 9 on account of the cumulative increase in the voltage of the series exciter 8 following an increase in the excitation current by the shunt exciter 7 due to the operation of the regulator.

While I have shown and described a particular embodiment of my invention, it will be obvious to those skilled in the art that changes and modifications may be made within the scope of my invention and I, therefore, aim in the appended claims to cover all such changes and modifications that fall within the true spirit and scope of my invention.

What I claim as new and desire to secure by Letters Patent of the United States is:

1. The combination of a synchronous dynamo-electric machine, an excitation circuit therefor, a main source of electrical energy for said excitation circuit, and an auxiliary source of excitation interposed in said excitation circuit responsive to current transients induced in the excitation circuit of said synchronous machine.

2. The combination with an electric power circuit, of a synchronous dynamo-electric machine connected to supply said circuit, an excitation circuit therefor, a main source of electrical energy for said excitation circuit, a regulator responsive to an electrical condition of said power circuit for controlling said excitation circuit, and an auxiliary source of excitation interposed in said excitation circuit responsive to current transients induced in the excitation circuit of said synchronous machine.

3. The combination with an electric power transmission system, of a synchronous dynamo-electric machine for supplying power thereto, an excitation circuit therefor, a main source of electrical energy for said excitation circuit, a regulator responsive to the voltage of said synchronous machine for controlling the steady-state current in said excitation circuit, and an auxiliary source of excitation interposed in said excitation circuit responsive to current transients induced in the excitation circuit of said synchronous machine.

4. In combination, an alternating-current dynamo-electric machine, a field winding therefor, and means comprising a dynamo-electric machine for impressing upon said field winding an excitation voltage comprising one component the value of which is substantially unaffected by current changes in said field winding and another component the value of which varies substantially simultaneously with changes of current in said field winding.

5. In combination, an alternating-current generator, a field winding therefor, a source of electrical energy for said field winding, means responsive to an electrical condition of said generator for regulating said source of electrical energy, and an auxiliary source of excitation responsive to current transients induced in the field winding of said generator.

6. In combination, a synchronous dynamo-electric machine, a field winding therefor, a shunt-type direct-current exciter energizing said field winding, and an unsaturated series-type direct-current exciter in series with said shunt-type exciter.

7. In combination, an alternating-current generator, a field winding therefor, a shunt-type direct-current exciter energizing said field winding, a regulator responsive to the voltage of said generator influencing the voltage of said exciter, and a quick-acting series-type direct-current exciter in series with said shunt-type exciter.

8. A regulating system comprising an alternating-current synchronous dynamo-electric machine, a source of excitation for said synchronous machine, a regulator operative in response to an electrical condition of said synchronous machine for controlling the voltage of said source, and means interposed in circuit with said source of excitation for lengthening the duration of current transients induced in said excitation circuit to maintain the voltage of said synchronous machine during the interval necessary for the operation of said regulator to be effective.

9. A regulating system comprising a synchronous dynamo-electric machine, a main source of excitation therefor, a regulator responsive to the voltage of said synchronous machine for controlling the voltage of said main source of excitation and an auxiliary source of excitation for sustaining an instantaneous increase in excitation current substantially to balance the armature reaction occasioned by sudden change in load upon said synchronous machine.

10. A regulating system comprising a synchronous alternating-current generator, a field circuit therefor, a shunt-type dynamo-electric machine connected for energizing said field circuit, a regulator responsive to the voltage of said synchronous generator for controlling the voltage of said dynamo-electric machine, and a quick-acting series-type exciter interposed in said field circuit for maintaining the voltage of said generator upon sudden application of load.

In witness whereof, I have hereunto set my hand this 7th day of May, 1925.

ROBERT E. DOHERTY.